United States Patent
Davis, Jr. et al.

(10) Patent No.: US 6,250,706 B1
(45) Date of Patent: Jun. 26, 2001

(54) INTEGRATED FLAT CABLE CONNECTOR

(75) Inventors: Joseph J. Davis, Jr., Ortonville; David A. Hein, Sterling Heights, both of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/518,994

(22) Filed: Mar. 3, 2000

Related U.S. Application Data
(60) Provisional application No. 60/149,323, filed on Aug. 17, 1999.

(51) Int. Cl.[7] .............................. H01R 11/05; B62D 25/14
(52) U.S. Cl. ............................................. 296/70; 174/72 A
(58) Field of Search .......................... 296/70; 174/72 A, 174/72 TR; 439/34

(56) References Cited

U.S. PATENT DOCUMENTS

| | | | |
|---|---|---|---|
| 4,416,497 | 11/1983 | Brandsness et al. | 339/17 F |
| 4,522,114 | 6/1985 | Matsuno | 98/2.09 |
| 4,650,925 | 3/1987 | Coldren | 174/135 |
| 4,815,984 | 3/1989 | Sugiyama et al. | 439/211 |
| 5,297,334 * | 3/1994 | Johnson | 29/861 |
| 5,309,634 * | 5/1994 | Van Order et al. | 29/863 |
| 5,324,203 | 6/1994 | Sano et al. | 439/34 |
| 5,460,530 | 10/1995 | Toba et al. | 439/34 |
| 5,549,344 | 8/1996 | Nishijima et al. | 296/70 |
| 5,709,358 * | 1/1998 | Kubota | 248/27.1 |
| 5,735,041 | 4/1998 | Zaguskin et al. | 29/857 |
| 5,841,070 * | 11/1998 | Takiguchi et al. | 174/72 A |
| 5,846,091 * | 12/1998 | Nishijima et al. | 439/34 |
| 5,856,908 | 1/1999 | Takiguchi et al. | 361/690 |
| 5,877,936 | 3/1999 | Nishitani et al. | 361/600 |
| 5,883,777 * | 3/1999 | Nishitani et al. | 361/647 |
| 5,931,682 * | 8/1999 | Takiguchi et al. | 439/34 |
| 6,048,020 * | 4/2000 | Gronowicz et al. | 396/70 |
| 6,095,272 * | 8/2000 | Takiguchi et al. | 180/90 |

FOREIGN PATENT DOCUMENTS 195 21 887
A1  12/1996  (DE).

OTHER PUBLICATIONS

International Search Report, Dec. 20, 2000.

* cited by examiner

*Primary Examiner*—D. Glenn Dayoan
*Assistant Examiner*—Paul Chenevert
(74) *Attorney, Agent, or Firm*—Brooks & Kushman P.C.

(57) ABSTRACT

A cross-car beam for providing structural support for an instrument panel. The cross-car beam includes a primary wire harness for carrying electrical power to a plurality of electrical components housed within the instrument panel, a secondary wire harness having a secondary connector block connected thereto, and a primary connector block affixed to the cross-car beam adjacent the primary wire harness for mating with the secondary connector block. In this manner the secondary wire harness is electrically connected to the primary wire harness. Additionally, the secondary connector block has a plurality of electrical terminals for electrically contacting a plurality of conductors disposed on the primary wire harness.

14 Claims, 4 Drawing Sheets

INTEGRATED FLAT CABLE CONNECTOR

CROSS-REFERENCE TO RELATED APPLICATION

This application claims the benefit of U.S. Provisional Application Ser. No. 60/149,323, filed Aug. 17, 1999.

TECHNICAL FIELD

The present invention relates to flat copper cables, and to connectors for communicating electrical signals to a plurality of electrical devices.

BACKGROUND ART

Typically, instrument panels house a plurality of electrical components, such as engine gauges, air conditioning controls, radios, lighters, glove box lights and the like. These electrical devices must be provide power by a wire harness packaged within the instrument panel. Generally, a wire harness is made with a plurality of pigtails having an electrical connector disposed at one end for connecting to an electrical device, such as one referenced above.

As the electrical devices increase in the instrument panel so does the complexity of the wire harness. More complex wire harnesses are generally larger leading to larger assembly costs, weight, and more difficult to package. Typically, the same wire harness is used over a similar series of vehicles. Therefore, a vehicle having only a few of the myriad of options available may contain a complex wire harness which is under utilized.

Accordingly, a need exists for a new improved means for connecting electrical devices to a flat copper cable wire harness. The new and improved means must eliminate unutilized wire harness cable while provide a quick and easy means to connect additional cable to the wire harness.

DISCLOSURE OF INVENTION

Accordingly, an object of the present invention is to provide an instrument panel having a wire harness connector affixed thereto for connecting a secondary wire harness to a primary wire harness.

In accordance with this and other objects, the present invention provides a new and improved instrument panel for use in an automobile. The instrument panel has a cross-car beam which provides structural support for the instrument panel, a primary wire harness for carrying electrical power to a plurality of electrical components housed within the instrument panel, a secondary wire harness having a secondary connector block connected thereto, a primary connector block affixed to the cross-car beam adjacent the primary wire harness for mating with the secondary connector block. In this manner, the secondary wire harness is electrically connected to the primary wire harness. The secondary connector block has a plurality of electrical terminals for electrically contacting a plurality of conductors disposed on the primary wire harness. The present invention provides a means to easily electrically connect a secondary wire harness to a primary wire harness.

In accordance with another aspect of the present invention the primary and secondary wire harnesses are preferably a flat copper cable.

In accordance with still another aspect of the present invention the primary connector block is integrally molded to the cross-car beam.

In accordance with still another aspect of the present invention the cross-car beam further comprises a front panel and a back panel.

In accordance with still another aspect of the present invention the primary connector block is integrally molded to the front panel of the instrument panel.

In accordance with still another aspect of the present invention the primary connector block is a male connector end.

In accordance with still another aspect of the present invention the secondary connector block is a female connector end.

In accordance with yet another aspect of the present invention a cross-car beam for providing structural support for an instrument panel is provided. The cross-car beam includes a primary wire harness for carrying electrical power to a plurality of electrical components housed within the instrument panel, a secondary wire harness having a secondary connector block connected thereto, and a primary connector block affixed to the cross-car beam and adjacent the primary wire harness for mating with the secondary connector block. In this manner, the secondary wire harness is electrically connected to the primary wire harness. Additionally, the secondary connector block has a plurality of electrical terminals for electrically contacting a plurality of conductors disposed on the primary wire harness.

The above features, benefits and advantages and other features, benefits and advantages of the present invention are readily apparent from the following detailed description of the best mode for carrying out the invention when taken together with the accompanying drawings.

BEST MODE FOR CARRYING OUT THE INVENTION

Figure 1:
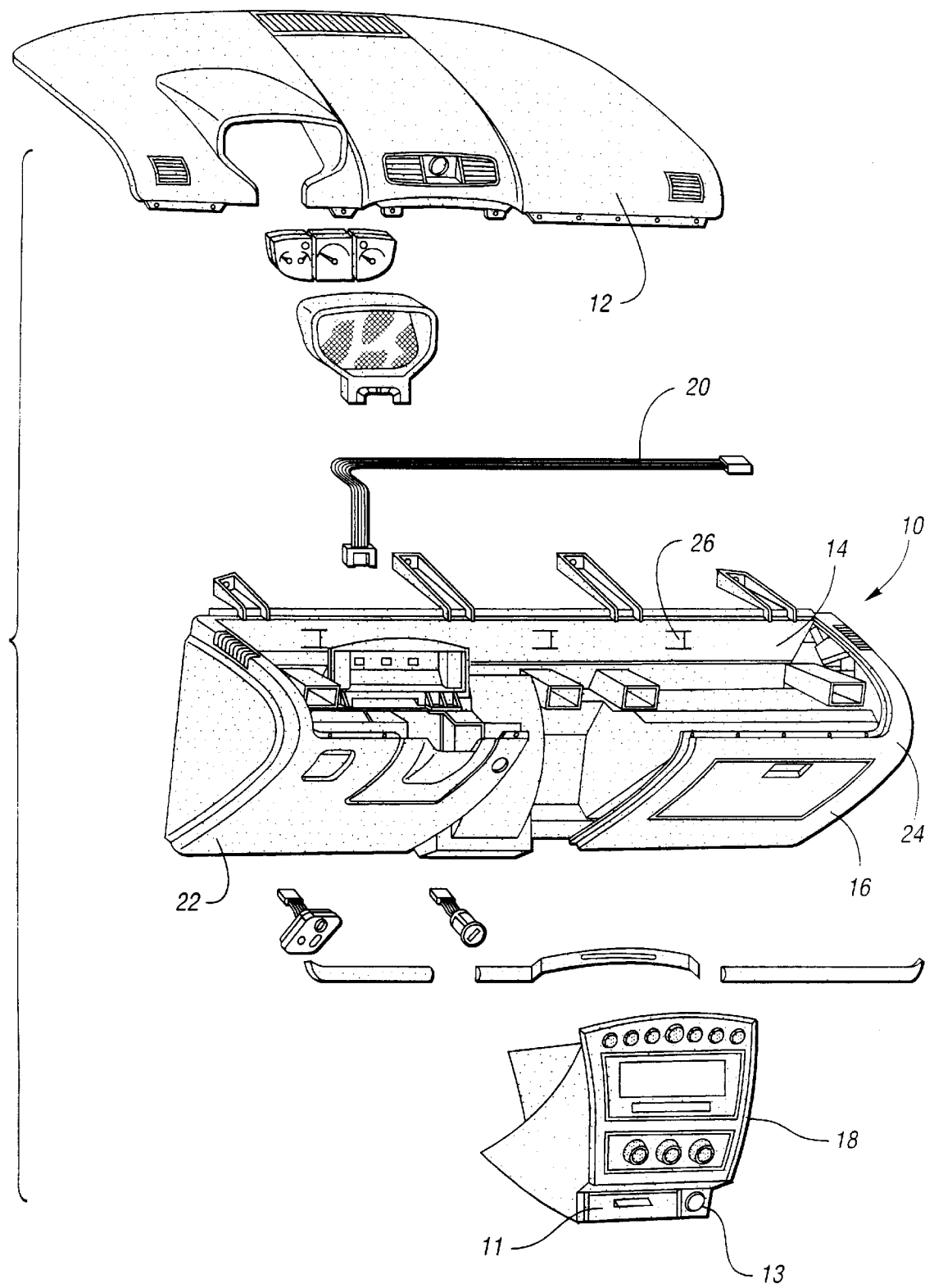
FIG. 1 is a perspective view of an instrument panel configured to attach to an interior of an automobile and having a primary wire harness for communicating electrical signals to a plurality of electrical components packaged within the instrument panel, in accordance with the present invention.

Referring now to FIG. 1, an instrument panel assembly is generally indicated by reference numeral 10. Instrument panel 10 includes a top panel 12, a cross-car beam 14, a front panel 16, and a center stack 18. Top panel 12 is configured to attach to cross-car beam 14 and front panel 16 to enclose the myriad of electronic devices housed within the instrument panel 12. Center stack 18 typically holds a stereo and may include an ashtray 11 and lighter 13. Center stack 18 is configured to meet with the top panel 12 and front panel 16 in order to provide a unified instrument panel appearance.

To provide electrical power, as well as a medium for transmitting control signals to and from the myriad of electronic devices contained within the instrument panel a wire harness 20 is provided. Wire harness 20 is preferably a flat copper cable comprised of copper on Mylar. Wire harness 20 generally runs longitudinally across the cross-car beam 14 from a driver's end 22 to a passenger end 24 of the instrument panel 10.

Preferably, a connector block 26 is integrally molded to the cross-car beam 14 and provides one half of an electrical connector for communicating power and electrical signals from wire harness 20 to a particular electrical device housed within the instrument panel 10.

Figure 2:
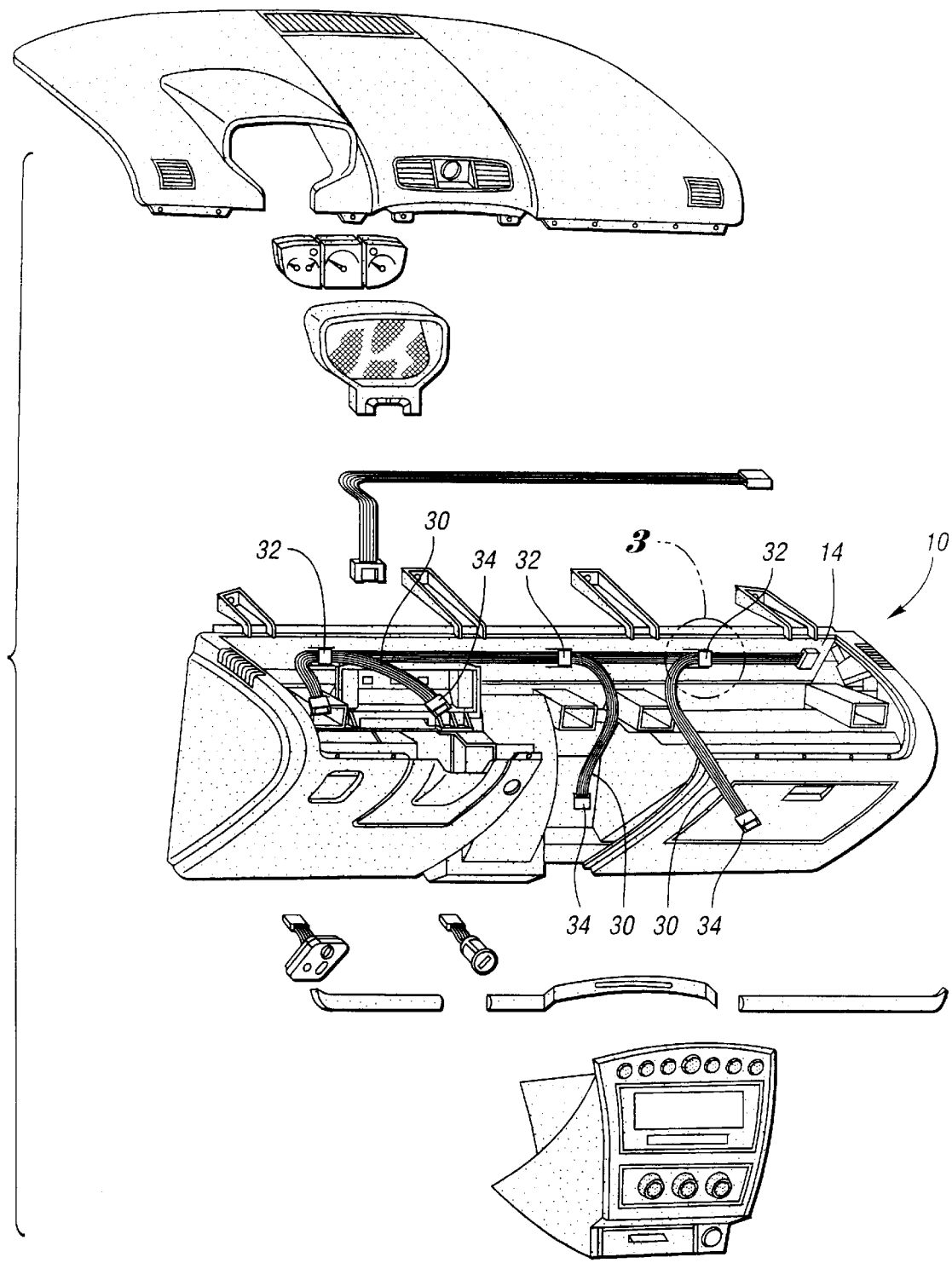
FIG. 2 is a perspective view of an instrument panel configured to attach to an interior of an automobile and having a primary wire harness, and a secondary wire harness connected thereto for communicating electrical signals to a plurality of electrical components packaged within the instrument panel, in accordance with the present invention.

Referring now to FIG. 2, instrument panel 10 is shown with wire harness 20 attached to the cross-car beam 14, and having a plurality of wire harness pigtails in electrical communication therewith, in accordance with the present invention. As illustrated, wire harness pigtails 30 generally comprise connector ends 32 and 34. Connector ends 32 and 34 are disposed at either end of a flat copper cable. Wire harness pigtails 30 preferably are comprised of copper conductors on a Mylar sheet material. Wire harness pigtails 30 at their female connector ends 32 make electrical contact with wire harness 20 by contacting copper traces or conductors on wire harness 20. The details of this connection will be disclosed in more detail below.

Figure 3:
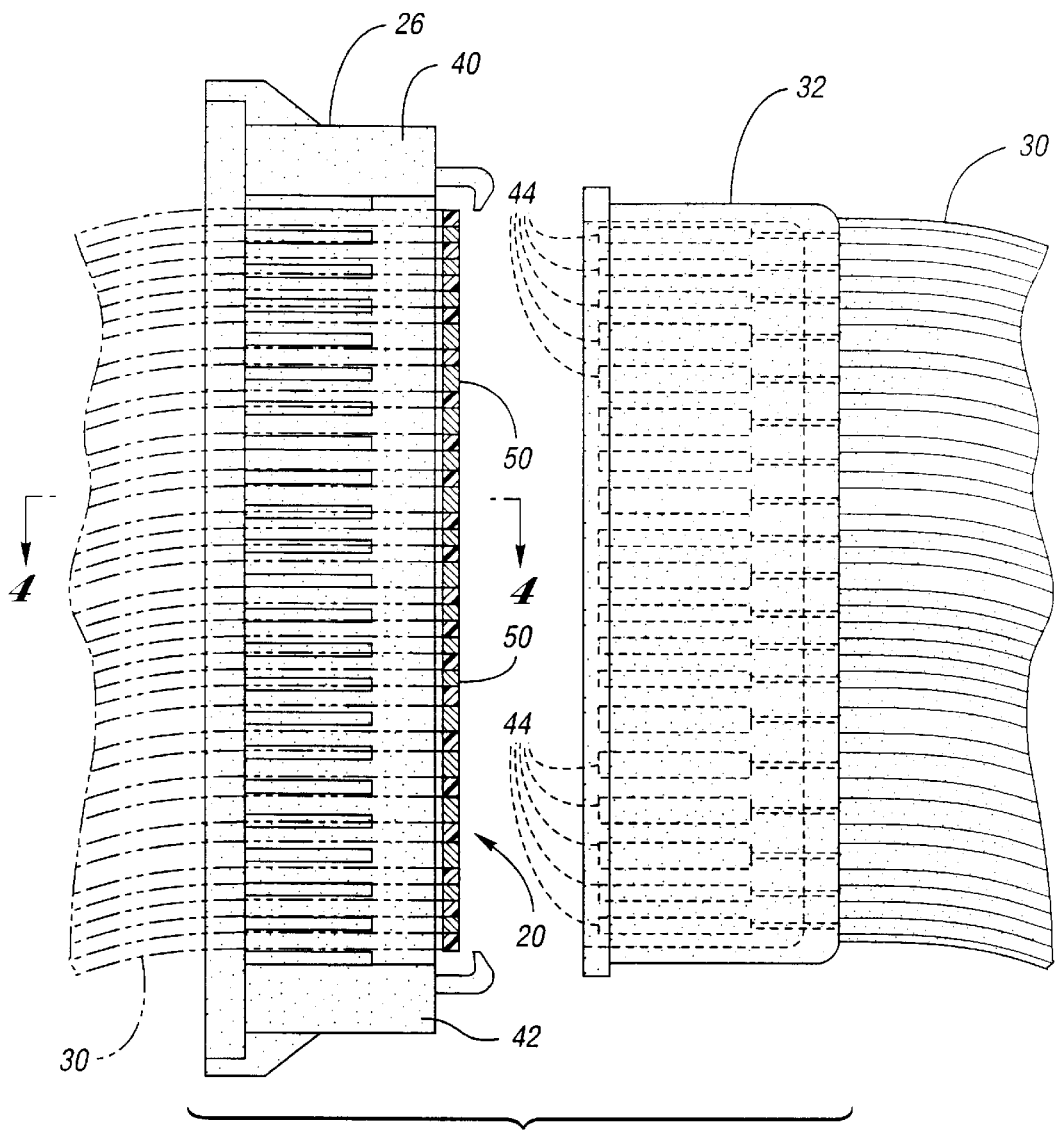
FIG. 3 is an enlarged view of the primary connector block, as shown in FIG. 2, affixed to the cross-car beam and further depicting the secondary connector block attached to the secondary wire harness, in accordance with the present invention.

Referring now to FIG. 3, male connector end 26 integrally molded with cross-car beam 14 is illustrated, in accordance with the present invention. Wire harness 20 as shown is disposed or lays over top of male connector 26 and is prevented from moving transversely by end posts 40 and 42. In operation, female connector 32 is positioned between the end posts 40 and 42 and is pushed onto male connector 26 sandwiching wire harness 20 therebetween. A plurality of connector terminals 44 of female connector 28 make electrical contact with the plurality of copper traces or conductors 50 on wire harness 20 thereby electrically connecting a secondary wire harness with the primary wire harness. Of course other electrical connections for connecting similar secondary wire harnesses to the primary wire harness can be made anywhere along the primary wire harness. Thus, the present invention provides a wire harness assembly which is extremely flexible. Moreover, the wire harness of the present invention may be configured in numerous ways as dictated by instrument panel design and electrical component content.

Figure 4:
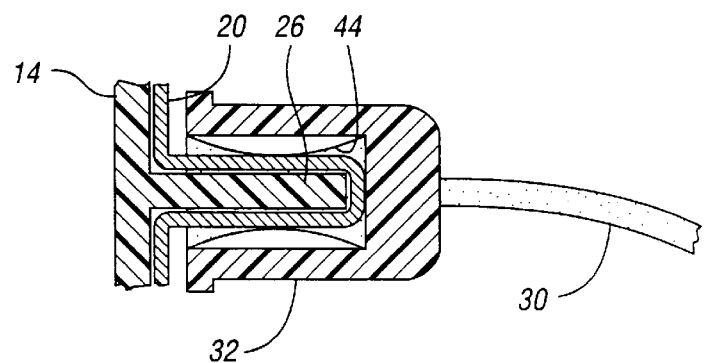
FIG. 4 is a cross sectional view of FIG. 3 illustrating the engagement of the primary connector block with the secondary connector block and the contact between the terminals of the secondary connector block and the conductors on the primary wire harness, in accordance with the present invention.

Referring now to FIG. 4, female connector 28 is shown mated with male connector 26, in accordance with the present invention. When female connector 28 has engaged male connector 26 proper alignment of terminals 44 on conductors 50 is achieved by the guidance of female connector 28 provided by posts 40 and 42. More specifically, wire harness 20 is prevented from moving transversely with respect to male connector 26 and accordingly female connector 28 is prevented from moving transversely with respect to male connector 26 by the contact of a connector surface of female connector 28 with posts 40 and 42. After female connector 28 is fully engaged with male connector 26 the wire harness pigtail 30 is able to communicate electrical signals to an electrical component attached to the instrument panel. As mentioned above, integrally formed male connectors 26 may be positioned anywhere along the cross-car beam to provide quick and easy connection of an electrical component to the primary wire harness.

Figure 5:
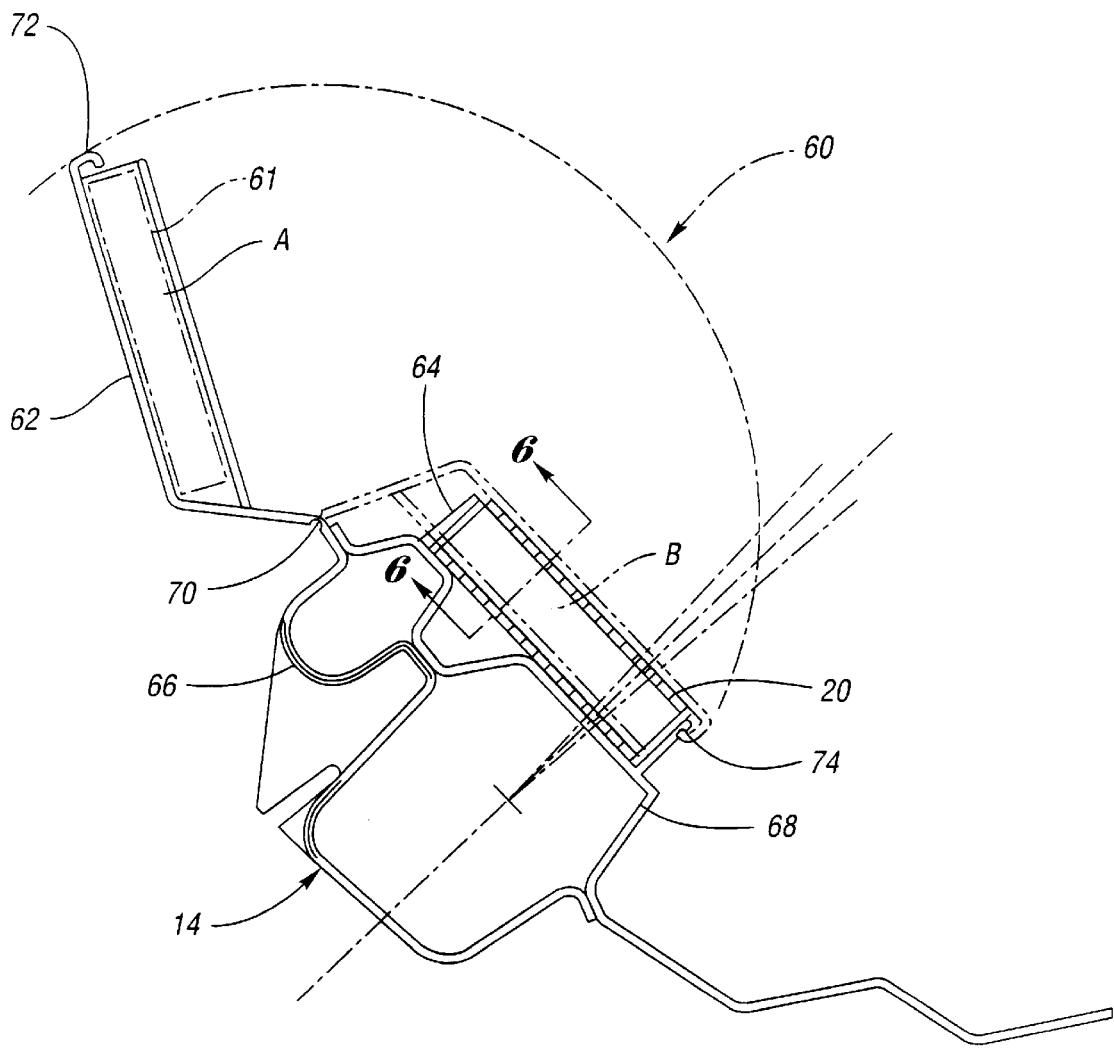
FIG. 5 is a perspective view of an integrated connector, in accordance with another aspect of the present invention.
Figure 6:
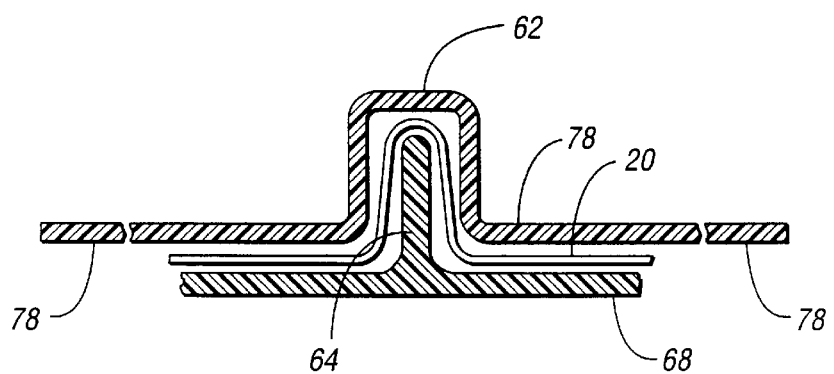
FIG. 6 is a cross-sectional view of the integrated connector at a location indicated in FIG. 5, in accordance with the present invention.

In accordance with another aspect of the invention, an integrated connector 60 is illustrated in FIGS. 5 and 6. FIG. 5 is a side elevation of connector 60 and FIG. 6 is a cross-sectional view through connector 60 at the location indicated on FIG. 5. Integrated connector 60 has a female connector portion 62 which snaps and locks onto a male connector portion 64. Female connector portion is integrally molded to back panel 66 of cross-car beam 14 and male connector portion 64 is integrally molded to front panel 68 of the cross-car beam 14. This is done so that back panel 66 may be made out of ABS with poly-carbonate or similar material to form a living hinge 70, while front panel 68 may be made out of a less expensive material or a material having different material properties. Female connector portion 62 is shown in an open position as indicated by reference letter A and in a closed position as indicated by reference letter B.

In operation wire harness 20 is loaded onto male connector portion 64. Female connector portion 62 having electrical connector terminal and a secondary wire harness (not shown) connected thereto is then rotated about living hinge 70 and positioned over top off male connector portion 64. Female connector portion 62 further includes a clasp 72 which cooperates with a tab 74 to removably secure the female connector portion 62 to the male connector portion 64. When female connector portion 62 snaps down onto male connector portion 64 and clasp 72 engages tab 74 wire harness 20 is in electrical communication with the secondary wire harness.

As indicated in FIG. 6 a flap 78 is integrally formed with female connector portion 62 to protect wire harness 20. Flap 78 may be as long as desired covering only a portion of wire harness 20 or the entire length of wire harness 20.

Accordingly, it is readily apparent from the above disclosure that the present invention offers many advantages and benefits over the prior art. For example, the present invention eliminates additional parts by integrating a male connector end into a cross-car beam. Moreover, the present invention reduces wire harness complexity by providing a quick and easy means to electrically connect to a wire harness. Further, the present invention allows vehicle designers to use one wire harness design for a variety of vehicles containing different accessory options.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An instrument panel for use in a vehicle, comprising:
    a cross-car beam for providing structural support for the instrument panel;
    a primary wire harness for carrying electrical power to a plurality of electrical components housed within the instrument panel;
    a secondary wire harness having a secondary connector block connected thereto, wherein the secondary connector block has a plurality of electrical terminals for electrically contacting a plurality of conductors disposed on the primary wire harness; and
    a primary connector block integrally molded to the cross-car beam and adjacent the primary wire harness for directly mechanically mating with the secondary connector block to electrically connect the primary wire harness to the secondary wire harness.

2. The instrument panel of claim 1, wherein the primary wire harness is a flat copper cable.

3. The instrument panel of claim 1, wherein the secondary wire harness is a flat copper cable.

4. The instrument panel of claim 1, wherein the cross-car beam further comprises a front panel and a back panel.

5. The instrument panel of claim 4, wherein the primary connector block is integrally molded to the front panel.

6. The instrument panel of claim 1, wherein the primary connector block is a male connector end.

7. The instrument panel of claim 1, wherein the secondary connector block is a female connector end.

8. A cross-car beam for providing structural support for an instrument panel, comprising:

a primary wire harness for carrying electrical power to a plurality of electrical components housed within the instrument panel;

a secondary wire harness having a secondary connector block connected thereto, wherein the secondary connector block has a plurality of electrical terminals for electrically contacting a plurality of conductors on the primary wire harness; and a primary connector block integrally molded to the cross car beam and adjacent the primary wire harness for directly mechanically mating with the secondary connector block to electrically connect the primary wire harness to the secondary wire harness.

9. The cross-car beam of claim 8, wherein the primary wire harness is a flat copper cable.

10. The cross-car beam of claim 8, wherein the secondary wire harness is a flat copper cable.

11. The cross-car beam of claim 8, wherein the primary connector block is integrally molded to the cross car beam.

12. The cross-car beam of claim 8, wherein the cross car beam further comprises a front panel and a back panel.

13. The cross-car beam of claim 8, wherein the primary connector block is a male connector end.

14. The cross-car beam of claim 8, wherein the secondary connector block is a female connector end.

\* \* \* \* \*